G. W. WELTON, Sr.
BEET HARVESTER.
APPLICATION FILED NOV. 5, 1920.

1,403,929.

Patented Jan. 17, 1922.

Inventor
G. W. Welton
By D. Swift
his Attorney

UNITED STATES PATENT OFFICE.

GEORGE W. WELTON, SR., OF BRIDGEPORT, NEBRASKA.

BEET HARVESTER.

1,403,929.  Specification of Letters Patent.  Patented Jan. 17, 1922.

Application filed November 5, 1920. Serial No. 421,903.

*To all whom it may concern:*

Be it known that I, GEORGE W. WELTON, Sr., a citizen of the United States, residing at Bridgeport, in the county of Morrill, State of Nebraska, have invented a new and useful Beet Harvester; and I do hereby declare the following to be a full, clear, and exact description of the invention, such as will enable others skilled in the art to which it appertains to make and use the same.

The invention relates to beet harvesters and has for its object to provide a machine, which as the same is moved forwardly pulls the beets after the ground has been loosened, then conveys the beets upwardly and rearwardly, during which action they are topped, the tops discharged to one side of the machine and the beets then conveyed to cleaning brushes, which brushes clean and further convey the beets rearwardly and deposit them preferably in a transversely disposed conveyor for delivering the cleaned beets to a conveyance at the side of the beet harvester.

A further object is to provide a beet harvester comprising inclined conveyors carried by a pivoted frame, said frame having also carried thereby spaced uprooting cones adjacent plows also carried by the pivoted frame. The rear end of the pivoted frame is pivoted on a drive shaft rotatably mounted in bearings carried by the main frame, said shaft being provided with gearing meshing with gears carried by the rear end of the cone shafts and an engine for rotating the main shaft for rotating said cones. Also to provide lever means for raising or lowering the forward end of the pivoted frame and consequently raising or lowering the cone shaped uprooting members and the plows.

A further object is to provide adjacent the upper ends of the endless conveyors topping members, which topping members and conveyors are driven through connections with the axle of the supporting wheel of the harvester.

A further object is to form the endless conveyor belts from linked members, to the outer faces of which are attached tubular members formed from rubber or other resilient material, said tubular members forming means for grasping and holding the tops of the beets as said beets are moved upwardly between the conveyors.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
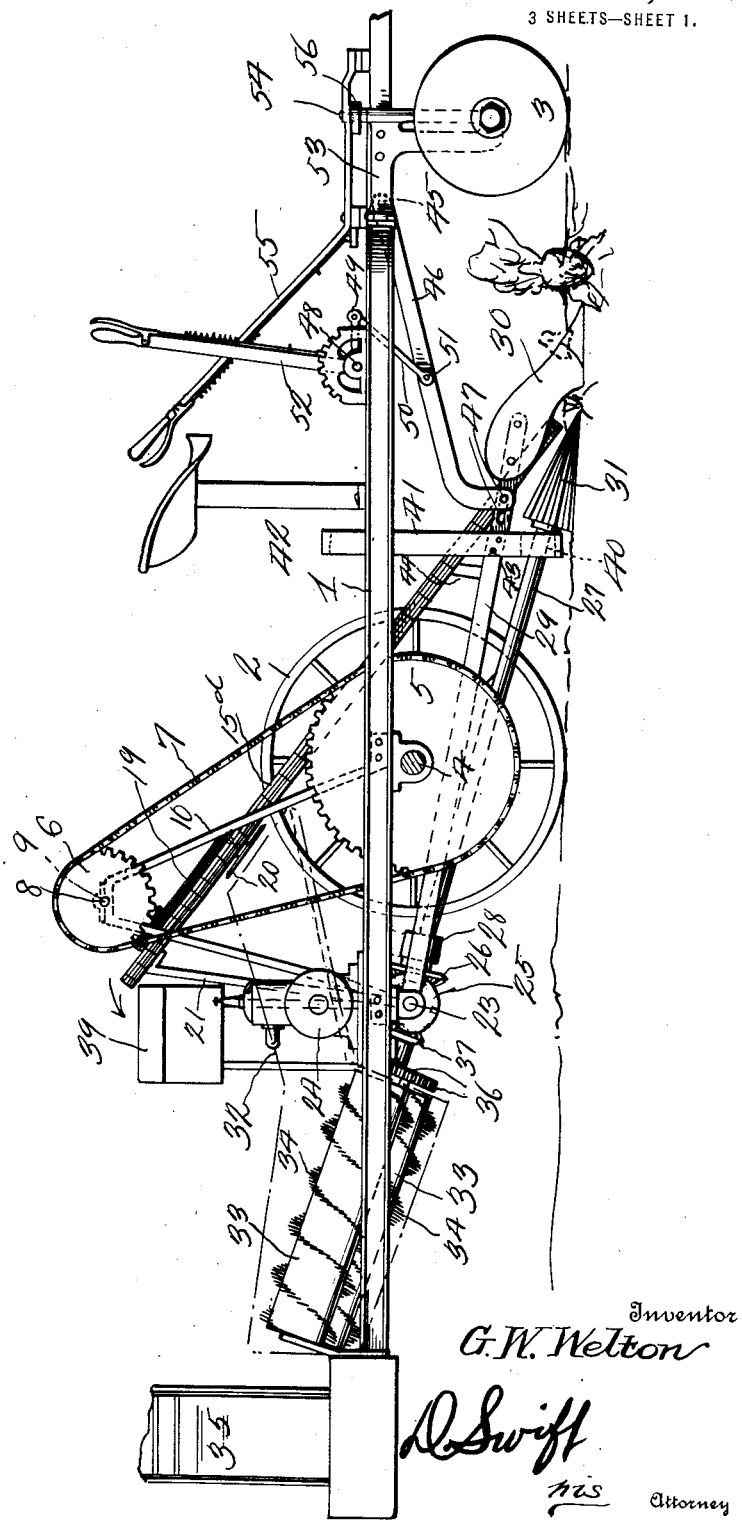
Figure 1 is a side elevation of the harvester, the axle being shown in section with one wheel removed to better show the structure.
Figure 2:
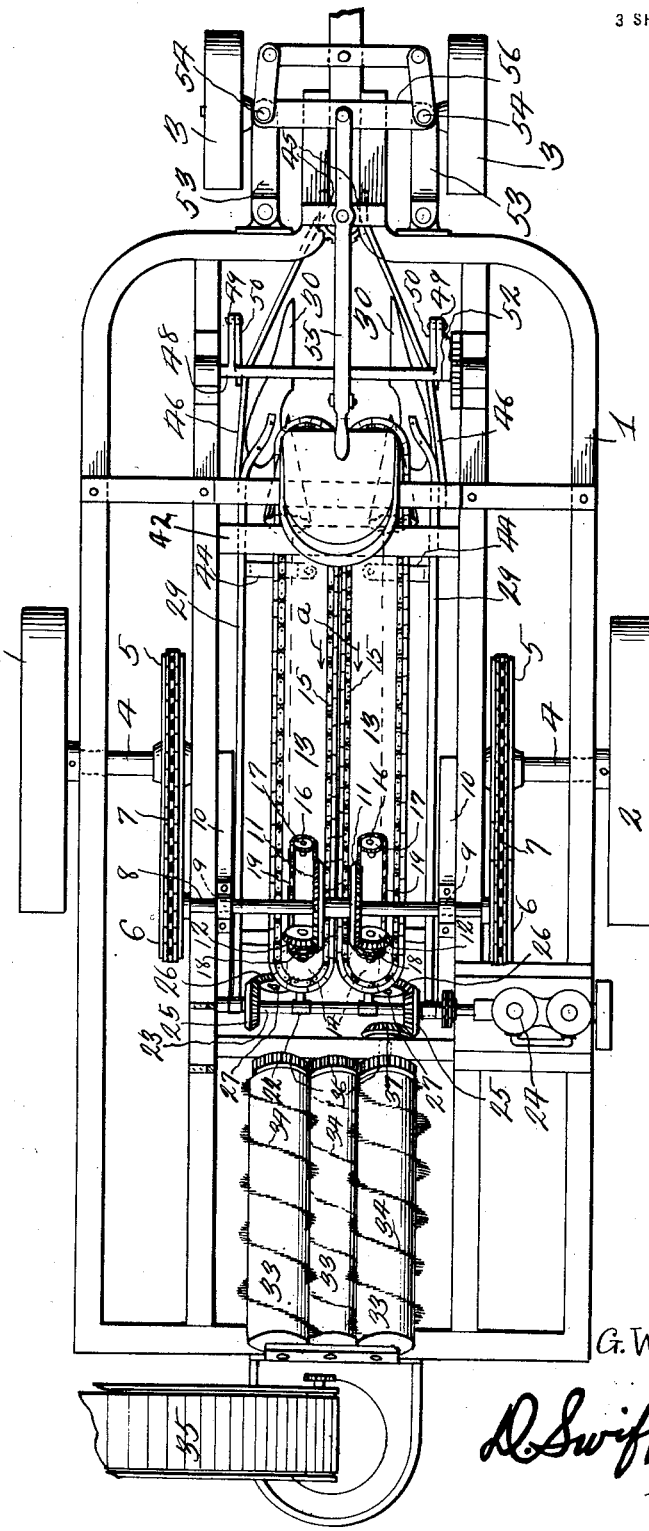
Figure 2 is a top plan view of the harvester.
Figure 3:
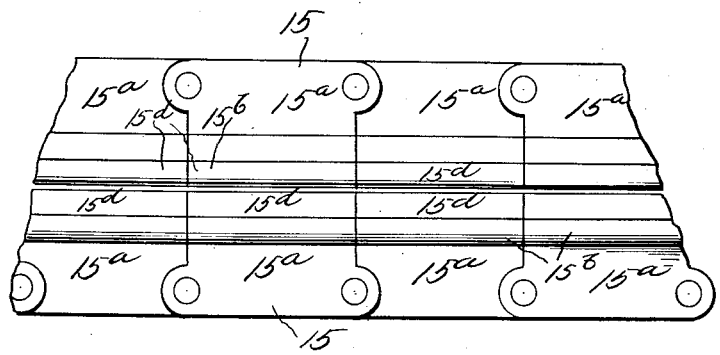
Figure 3 is an enlarged detail view of the adjacent sides of portions of the endless conveyor chains, showing the resilient tubular sections carried thereby.
Figure 4:
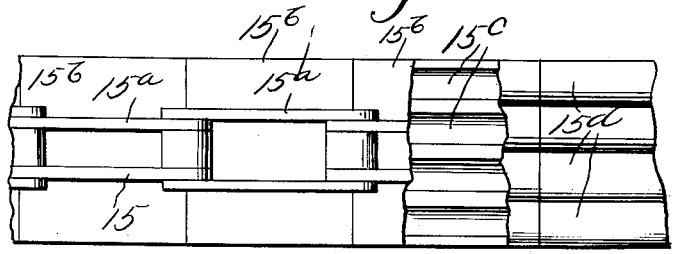
Figure 4 is a rear elevation of one of the conveyor chains, and showing a front face view of a portion of the adjacent conveyor chain, parts broken away to show the link structure.
Figure 5:
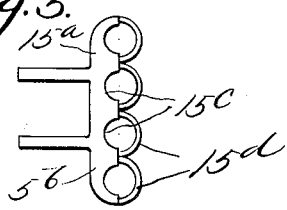
Figure 5 is an end view of one of the links.
Figure 6:
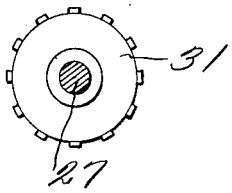
Figure 6 is a rear view of one of the cones.
Figure 7:
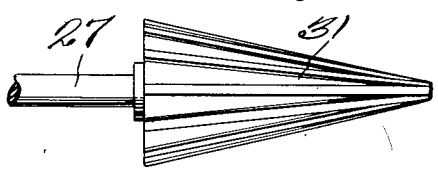
Figure 7 is an enlarged side elevation of one of the cones.

Referring to the drawings, the numeral 1 designates the main frame of a harvester, which frame is supported on the wheels 2 and 3. Wheels 2 are secured to axles 4 which are rotated as the vehicle moves forwardly during a harvesting operation. Secured to the shafts 4 are sprockets 5 and around said sprockets and around sprockets 6, sprocket chains 7 pass. Sprockets 6 are carried by the ends of a transversely disposed shaft 8, which shaft 8 will be rotated as the wheels move forwardly over the ground. Shaft 8 is rotatably mounted in bearings 9 on brackets 10 which rise upwardly from the frame 1. Secured to the shaft 9 substantially centrally thereof are spaced bevelled gears 11, which gears mesh with bevel gears 12 carried by shafts rotatably mounted in conveyor frames 13, which conveyor frames at their rear ends are provided with spockets 14 which operate the conveyor chains 15 in the direction of the arrows *a*, Figure 2. Rotatably mounted in bearings of the conveyor frames 13 are shafts 16 and around sprockets 17 on said shafts and sprockets 18, on shafts carried by the sprockets 14 sprocket chains 19 pass. It will be seen that as the shaft rotates the chains 19 will cause the shafts 16 to also rotate, thereby rotating topping discs 20 carried by the lower ends of the shaft 16. Each conveyor frame 13 has extending downwardly from the rear end thereof arms 21 which support the conveyor frame at their rear ends, the lower ends of said arms 21 being pivotally mounted as at 22 on a transversely disposed drive shaft 23. Conveyor frames 13 and consequently the endless conveyor chains 15 extend downwardly and forwardly and terminate at a point substantially above digging elements hereinafter set forth and described.

Shaft 23 extends transversely of the machine and is rotatably mounted in bearings carried by the frame 1; said shaft is rotated by an engine 24 mounted on the frame 1, said engine being provided for driving mechanism hereinafter described so that not all of the power necessary for operating the harvester as a whole will be obtained from draft animals through the ground engaging wheels 2. Shaft 23 has secured thereto bevel gears 25 which bevel gears mesh with bevel gears 26 carried by the rear ends of downwardly and forwardly extending shafts 27. The rear ends of the shafts 27 are rotatably mounted in bearings of a cross member 28, which cross member connects forwardly and downwardly extending pivoted plow beams 29 together, the rear ends of said plow beams being pivotally connected on the shaft 23 and the forward ends of said plow beams having secured thereto in any suitable manner plows 30 which are spaced apart and are adapted to break the ground on each side of the beet as the machine moves forwardly so that corrugated cones 31 which are located to the rear of the plows 30 will engage the body of the beet and be carried by the forward ends of the shafts 27. Cones 31 are rotated upwardly and outwardly so that the beet will be lifted and uprooted and moved upwardly with its top between the conveyors and will be moved rearwardly, until the beet is severed from the top, said beet dropping into a trough 32, the rear end of which terminates above the forward end of rearwardly extending cleaning rollers 33, said cleaning rollers having thereon spirally arranged wire brushes 34 which not only clean the beet but also cause the beet to be moved rearwardly where it may be deposited on a conveyor 35, which conveyor extends transversely in relation to the machine and may be extended to a point where it can be disposed over a wagon which may move parallel with the harvesting machine. If so desired conveyor 35 may be eliminated and the beets gathered in a receptacle carried by the rear end of the frame 1. The forward ends of the rollers 33 are provided with gears 36 which mesh with each other, one of said rollers being provided with a bevel gear 37 which meshes with the bevel gear 25 carried by the shaft 23. It will be seen that not only the shafts 27 which carry the corrugated cones 31 are operated from the shaft 23, but also the cleaning rollers 33. After the beet has been severed from the top, said top continues upwardly between the conveyors and is deposited in a transversely disposed chute 39, which chute forms means for depositing the tops of the beet on the ground at the side of the machine, or if so desired into a receptacle carried by the side of the frame or into a conveyance also moving parallel with the machine.

The forward ends of the shafts 27 are rotatably mounted in bearings 40 of the arms 41 of a U-shaped brace 42, said U-shaped brace extending upwardly between the side rails of the frame 1 and being guided therebetween in its upward and downward movement and arching the pivotal plow beam 29 and the lower ends of the conveyors which move the beets upwardly and rearwardly. The arms 41 of the U-shaped brace 42 have secured thereto as at 43, the pivoted plow beams 29. The lower ends of the conveyor frames 13 have connected thereto braces 44, which braces are also connected to pivoted plow beams 29 and form means for rigidly supporting the conveyors.

Pivotally secured as at 45 to the forward end of the frame 1 are rearwardly and outwardly extending arms 46, said arms extending downwardly to the outer sides of the plow beams 29 and having a slot and pin connection 47 therewith. Rockably mounted in bearings of the frame, at a point substantially over the plows 30 is a transversely disposed rock shaft 48, said shaft being provided with forwardly extending arms 49, to which arms are pivotally connected links 50, which links have their lower ends pivotally connected as at 51 to the rearwardly extending members 46. Also carried by the shaft 48 is a lever 52, by means of which lever the members 46 may be forced upwardly, thereby causing the conveyors, the cone carrying shafts and cones, and the pivoted plow beams 29 to be pivoted upwardly or downwardly on the shaft 23 as a pivotal point. During this action the gears which operate the endless conveyor chains will be moved out of mesh with the bevel gears 11; therefore it will be seen that when the harvester is not being used for harvesting purposes, for instance when the same is being moved from place to place the conveyor chains and the topping members 20 will not be operated, thereby reducing the load on the animals to a minimum.

The wheels 3 are carried by forwardly extending pivoted brackets 53 in the outer ends of which wheel carrying brackets 54 are pivoted, said brackets being moved outwardly to either side by means of the pivoted lever 55 which is pivoted to a transversely movable link 56; however, it is to be understood that any kind of steering mechanism may be used in connection with the harvester. Each conveyor chain 15 comprises a series of links 15ª, said links on one of their sides being provided with plates 15ᵇ, which plates have longitudinally disposed segmentally shaped channels 15ᶜ, and arching said channels are segmentally shaped resilient members 15ᵈ, preferably made from rubber tubing. By providing resilient members 15ᵈ it will be seen that the beet tops will be securely held between the adjacent conveyor chains 15 of the conveyors thereby preventing the beets from slipping downwardly as they are moved rearwardly and upwardly and into engagement with the topping members 20.

From the above it will be seen that a beet harvester, topper and cleaner is provided, which is simple in construction and one wherein the operation of the various mechanisms is positive. It will also be seen that the device is so constructed that part of the power for driving the mechanism is obtained from the ground engaging wheels and part from an engine carried by the frame 1, thereby reducing the number of horses necessary to drag the harvester.

The invention having been set forth what is claimed as new and useful is:—

1. A beet harvester comprising a wheel supported frame, a transversely disposed drive shaft carried by said frame, forwardly and downwardly extending plow carrying beams having their rear ends pivotally mounted on the drive shaft, forwardly and downwardly extending shafts having beet raising elements at the forward ends thereof, said last named shafts having their rear ends provided with gear connections with the drive shaft, beet top grasping and holding conveyors disposed above the digging and raising elements, said conveyors having their rear ends supported by brackets pivotally mounted on the drive shaft, topping cutters carried by the conveyors adjacent their rear ends and means for operating said topping cutters and conveyors from ground engaging wheels.

2. A beet harvester comprising a wheel supported frame, a transversely disposed drive shaft rotatably mounted in bearings of said frame, forwardly and downwardly extending plow beams having plows thereon and forwardly and downwardly extending rotatable beet raising members, said plow beams being pivotally mounted on the drive shaft at their rear ends, gear connections between the drive shaft and the rotatable beet raising members whereby said members will be rotated inwardly, upwardly and outwardly, conveyors disposed above the above mentioned mechanism and having their rear ends supported by brackets having bearings on the drive shaft, a shaft disposed above the rear ends of the conveyors, said shaft being provided with gears disposed above each conveyor, cutter mechanisms carried by the rear ends of the conveyors and driven from the shaft disposed above the conveyors through gear and sprocket mechanism and lever means adjacent the forward end of the harvester for raising the plow members and the beet raising members.

3. A beet harvester comprising a wheel supported frame, a transversely disposed shaft rotatably mounted in bearings of said frame, plow beams having plows at their ends pivoted on said shaft, beet raising elements adjacent the forward ends of the plow beam and operated through gear connections with the shaft, conveyors upwardly and rearwardly extending and having their rear ends supported by brackets pivoted on the shaft, the forward ends of said conveyors being supported by the plow beams, means for raising the forward ends of the plow beams, whereby the conveyors will be tilted on their bearings on the supporting brackets and the beet raising elements simultaneously raised, topping mechanisms adjacent the rear ends of the conveyors, and mechanism operated by the ground engaging wheels for operating the conveyors and the topping mechanisms.

In testimony whereof I have signed my name to this specification in the presence of two subscribing witnesses.

GEORGE W. WELTON, Sr.

Witnesses:
 MABEL J. JOHNSON,
 FRANK IRVING.